US010208240B2

(12) United States Patent
Weaver, Jr. et al.

(10) Patent No.: US 10,208,240 B2
(45) Date of Patent: Feb. 19, 2019

(54) FLUID EFFICIENCY AND FLOW BACK ENHANCER

(71) Applicant: Halliburton Energy Services, Inc., Houston, TX (US)

(72) Inventors: Jimmie Dean Weaver, Jr., Duncan, OK (US); Chandra Sekhar Palla-Venkata, Sugar Land, TX (US); Dipti Singh, Kingwood, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 86 days.

(21) Appl. No.: 15/515,531

(22) PCT Filed: Dec. 5, 2014

(86) PCT No.: PCT/US2014/068770
§ 371 (c)(1),
(2) Date: Mar. 29, 2017

(87) PCT Pub. No.: WO2016/089419
PCT Pub. Date: Jun. 9, 2016

(65) Prior Publication Data
US 2017/0226405 A1 Aug. 10, 2017

(51) Int. Cl.
*C09K 8/58* (2006.01)
*C09K 8/62* (2006.01)
*C09K 8/035* (2006.01)
*C09K 8/467* (2006.01)
*C09K 8/506* (2006.01)
*E21B 43/20* (2006.01)
*C09K 8/502* (2006.01)

(52) U.S. Cl.
CPC ............ *C09K 8/58* (2013.01); *C09K 8/035* (2013.01); *C09K 8/467* (2013.01); *C09K 8/502* (2013.01); *C09K 8/506* (2013.01); *C09K 8/62* (2013.01); *E21B 43/20* (2013.01)

(58) Field of Classification Search
CPC .......... C09K 8/58; C09K 8/035; C09K 8/467; C09K 8/502; C09K 8/506; C09K 8/62; E21B 43/20
See application file for complete search history.

(56) References Cited

U.S. PATENT DOCUMENTS 5,672,144 A   9/1997  Hulme
2011/0112328 A1* 5/2011  Drovetskaya .......... A01N 25/30
                                              564/292

(Continued)

FOREIGN PATENT DOCUMENTS

WO    2012120143 A1    9/2012

OTHER PUBLICATIONS

International Search Report and Written Opinion issued in corresponding application No. PCT/US2014/068770 dated Aug. 17, 2015, 11 pgs.

(Continued)

*Primary Examiner* — Aiqun Li
(74) *Attorney, Agent, or Firm* — Chamberlain Hrdlicka

(57) ABSTRACT

The invention provides Formula I compounds, and its compositions, wherein HG, X, L, Y, m, and n are defined in the specification, as fluid efficiency and flow back enhancers for use in a method of treating subterranean formations.

19 Claims, 2 Drawing Sheets

(56) References Cited

U.S. PATENT DOCUMENTS

| | | | |
|---|---|---|---|
| 2011/0319313 A1* | 12/2011 | Wu .................... | A61K 8/416 |
| | | | 510/496 |
| 2012/0270758 A1 | 10/2012 | Saini et al. | |
| 2013/0310282 A1 | 11/2013 | Kulkarni et al. | |
| 2014/0262319 A1* | 9/2014 | Treybig ............... | C09K 8/035 |
| | | | 166/371 |

OTHER PUBLICATIONS

Document No. SPE 10656, Clay Stabilization—Criteria for Best Performance, Donald G. Hill, Dowell Div., Dow Chemicals U.S.A., Mar. 1982.

* cited by examiner

FLUID EFFICIENCY AND FLOW BACK ENHANCER

BACKGROUND OF THE INVENTION

Subterranean fracturing operations, such as in oil well productions, can suffer from the loss of fracturing fluid through fracture faces. If one can limit the loss of aqueous-based fluids in a formation matrix, however, the same volume of fluid could be capable of generating additional fracture length or, in the case of some shale formations, additional fracture complexity. Consequently, fracturing fluids often contain fluid loss additives such as starch, silica dust, and the like. However, these solid additives present clean-up issues. A liquid loss additive such as diesel can be effective, but diesel in particular results in little formation damage because diesel produces back with hydrocarbon production.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

Figure 1:
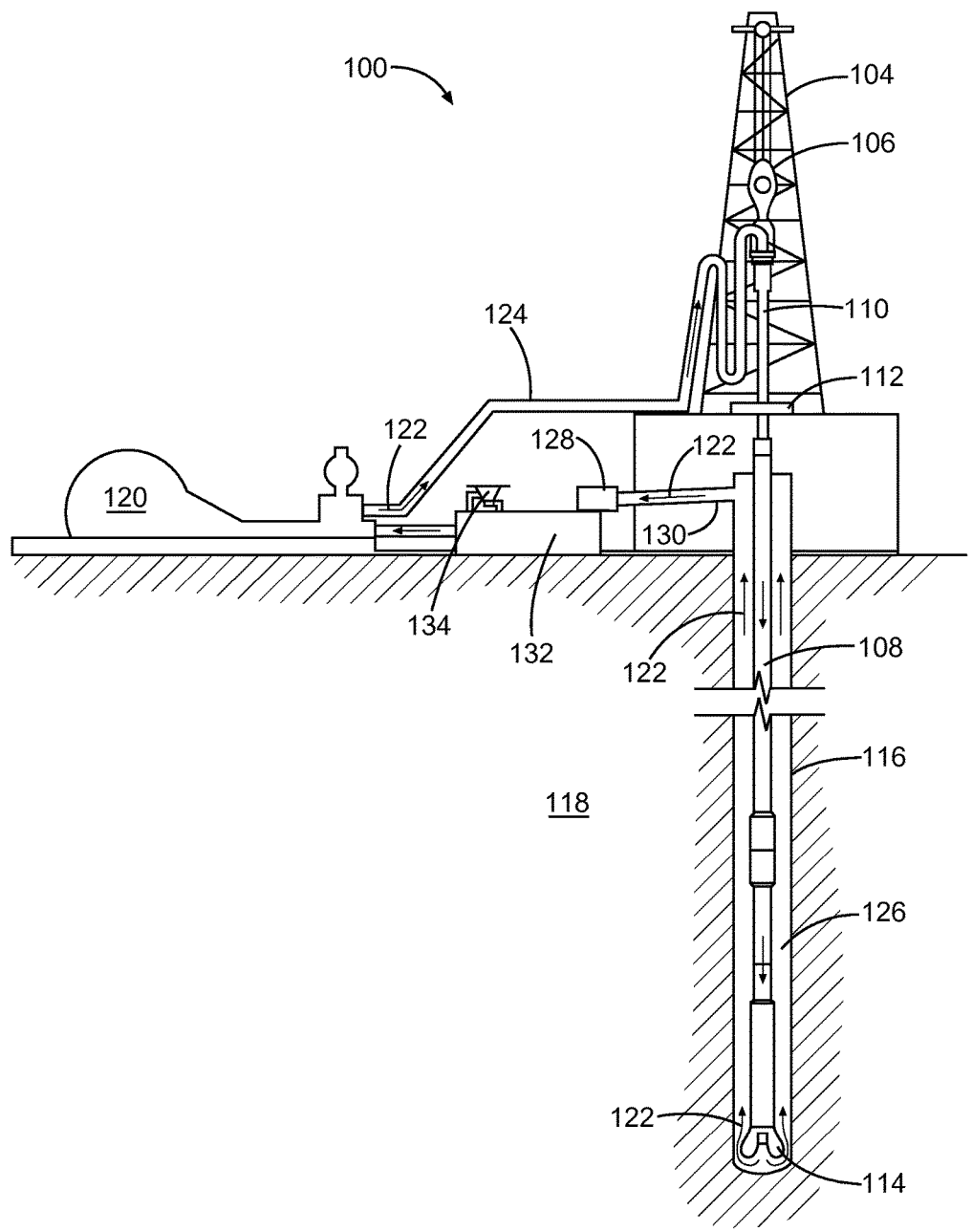
FIG. 1 illustrates a drilling assembly in accordance with various embodiments.

In addressing the challenges described above, the present invention provides a fluid composition comprising a compound according to Formula I, described in more detail below:

$$HG-X-L-Y \qquad (I)$$

that is useful as a fluid efficiency and flow back enhancer in treating a subterranean formation.

Reference will now be made in detail to certain embodiments of the disclosed subject matter, examples of which are illustrated in part by the accompanying drawings. While the disclosed subject matter will be described in conjunction with the enumerated claims, it will be understood that the exemplified subject matter is not intended to limit the claims to the disclosed subject matter.

Definitions

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packing fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

"Alkyl" refers to straight, branched chain, or cyclic hydrocarbyl groups including from 1 to about 20 carbon atoms. For instance, an alkyl can have from 1 to 10 carbon atoms or 1 to 5 carbon atoms. Exemplary alkyl includes straight chain alkyl groups such as methyl, ethyl, propyl, butyl, pentyl, hexyl, heptyl, octyl, nonyl, decyl, undecyl, dodecyl, and the like, and also includes branched chain isomers of straight chain alkyl groups, for example without limitation, —CH(CH$_3$)$_2$, —CH(CH$_3$)(CH$_2$CH$_3$), —CH(CH$_2$CH$_3$)$_2$, —C(CH$_3$)$_3$, —C(CH$_2$CH$_3$)$_3$, —CH$_2$CH(CH$_3$)$_2$, —CH$_2$CH(CH$_3$)(CH$_2$CH$_3$), —CH$_2$CH(CH$_2$CH$_3$)$_2$, —CH$_2$C (CH$_3$)$_3$, —CH$_2$C(CH$_2$CH$_3$)$_3$, —CH(CH$_3$)CH(CH$_3$)(CH$_2$CH$_3$), —CH$_2$CH$_2$CH(CH$_3$)$_2$, —CH$_2$CH$_2$CH(CH$_3$)(CH$_2$CH$_3$), —CH$_2$CH$_2$CH(CH$_2$CH$_3$)$_2$, —CH$_2$CH$_2$C(CH$_3$)$_3$, —CH$_2$CH$_2$C(CH$_2$CH$_3$)$_3$, —CH(CH$_3$)CH$_2$CH(CH$_3$)$_2$, —CH(CH$_3$)CH(CH$_3$)CH(CH$_3$)$_2$, and the like. Thus, alkyl groups include primary alkyl groups, secondary alkyl groups, and tertiary alkyl groups.

The phrase "substituted alkyl" refers to alkyl substituted at 1 or more, e.g., 1, 2, 3, 4, 5, or even 6 positions, which substituents are attached at any available atom to produce a stable compound, with substitution as described herein. "Optionally substituted alkyl" refers to alkyl or substituted alkyl.

Each of the terms "halogen," "halide," and "halo" refers to —F, —Cl, —Br, or —I.

The terms "alkylene" and "substituted alkylene" refer to divalent alkyl and divalent substituted alkyl, respectively. Examples of alkylene include without limitation, ethylene (—CH$_2$—CH$_2$—).

"Alkene" refers to straight, branched chain, or cyclic hydrocarbyl groups including from 2 to about 20 carbon atoms having one or more carbon to carbon double bonds, such as 1 to 3, 1 to 2, or at least one carbon to carbon double bond. "Substituted alkene" refers to alkene substituted at 1 or more, e.g., 1, 2, 3, 4, 5, or even 6 positions, which substituents are attached at any available atom to produce a stable compound, with substitution as described herein. "Optionally substituted alkene" refers to alkene or substituted alkene.

The term "alkenylene" refers to divalent alkene. Examples of alkenylene include without limitation, ethenylene (—CH=CH—) and all stereoisomeric and conformational isomeric forms thereof. "Substituted alkenylene" refers to divalent substituted alkene. "Optionally substituted alkenylene" refers to alkenylene or substituted alkenylene.

"Alkyne or "alkynyl" refers to a straight or branched chain unsaturated hydrocarbon having the indicated number of carbon atoms and at least one triple bond. Examples of a (C$_2$-C$_8$)alkynyl group include, but are not limited to, acetylene, propyne, 1-butyne, 2-butyne, 1-pentyne, 2-pentyne, 1-hexyne, 2-hexyne, 3-hexyne, 1-heptyne, 2-heptyne, 3-heptyne, 1-octyne, 2-octyne, 3-octyne and 4-octyne. An alkynyl group can be unsubstituted or optionally substituted with one or more substituents as described herein below.

The term "alkynylene" refers to divalent alkyne. Examples of alkynylene include without limitation, ethynylene, propynylene. "Substituted alkynylene" refers to divalent substituted alkyne.

The term "alkoxy" refers to an —O-alkyl group having the indicated number of carbon atoms. For example, a (C$_1$-C$_6$)alkoxy group includes —O-methyl (methoxy), —O— ethyl (ethoxy), —O-propyl (propoxy), —O-isopropyl (isopropoxy), —O-butyl (butoxy), —O-sec-butyl (sec-butoxy), —O-tert-butyl (tert-butoxy), —O-pentyl (pentoxy), —O-isopentyl (isopentoxy), —O-neopentyl (neopentoxy), —O-hexyl (hexyloxy), —O-isohexyl (isohexyloxy), and —O-neohexyl (neohexyloxy).

The term "aryl," alone or in combination refers to an aromatic monocyclic or bicyclic ring system such as phenyl or naphthyl. "Aryl" also includes aromatic ring systems that are optionally fused with a cycloalkyl ring as herein defined.

A "substituted aryl" is an aryl that is independently substituted with one or more substituents attached at any available atom to produce a stable compound, wherein the substituents are as described herein. "Optionally substituted aryl" refers to aryl or substituted aryl.

"Arylene" denotes divalent aryl, and "substituted arylene" refers to divalent substituted aryl. "Optionally substituted arylene" refers to arylene or substituted arylene.

The term "heteroatom" refers to N, O, and S. Inventive compounds that contain N or S atoms can be optionally oxidized to the corresponding N-oxide, sulfoxide or sulfone compounds.

"Heteroalkyl" means a saturated alkyl group having from 1 to about 20 carbon atoms, 1 to 10 carbon atoms, 1 to 6 carbon atoms, or 1 to 3 carbon atoms, in which from 1 to 3 carbon atoms are replaced by heteroatoms of O, S or N. Heteroalkyl is also intended to include oxidized S or N, such as sulfinyl, sulfonyl and N-oxide of a tertiary ring nitrogen. The point of attachment of the heteroalkyl substituent is at an atom such that a stable compound is formed. Examples of heteroalkyl groups include, but are not limited to, N-alkylaminoalkyl (e.g., CH$_3$NHCH$_2$—), N,N-dialkylaminoalkyl (e.g., (CH$_3$)$_2$NCH$_2$—), and the like.

"Heteroalkylene" refers to divalent heteroalkyl. The term "optionally substituted heteroalkylene" refers to heteroalkylene that is substituted with 1 to 3 substituents, e.g., 1, 2 or 3 substituents, attached at any available atom to produce a stable compound, wherein the substituents are as described herein.

"Heteroalkene" means a unsaturated alkyl group having from 1 to about 20 carbon atoms, 1 to 10 carbon atoms, 1 to 6 carbon atoms, or 1 to 3 carbon atoms, in which from 1 to 3 carbon atoms are replaced by heteroatoms of O, S or N, and having 1 to 3, 1 to 2, or at least one carbon to carbon double bond or carbon to heteroatom double bond.

"Heteroalkenylene" refers to divalent heteroalkene. The term "optionally substituted heteroalkenylene" refers to heteroalkenylene that is substituted with 1 to 3 substituents, e.g., 1, 2 or 3 substituents, attached at any available atom to produce a stable compound, wherein the substituents are as described herein.

The term "cycloalkyl" refer to monocyclic, bicyclic, tricyclic, or polycyclic, 3- to 14-membered ring systems, which are either saturated, unsaturated or aromatic. The cycloalkyl group may be attached via any atom. Cycloalkyl also contemplates fused rings wherein the cycloalkyl is fused to an aryl or hetroaryl ring as defined above. Representative examples of cycloalkyl include, but are not limited to cyclopropyl, cyclobutyl, cyclopentyl, and cyclohexyl. A cycloalkyl group can be unsubstituted or optionally substituted with one or more substituents as described herein below.

The term "cycloalkenyl" refers to a monocyclic, bicyclic, tricyclic, or polycyclic, 3- to 14-membered ring system, which is unsaturated. The cycloalkenyl group may be attached via any atom. Representative examples of cycloalkenyl include, but are not limited to, cyclopropenyl, cyclobutenyl, cyclopentenyl and cyclohexenyl.

The term "cycloalkylene" refers to divalent cycloalkyl. The term "optionally substituted cycloalkylene" refers to cycloalkylene that is substituted with 1 to 3 substituents, e.g., 1, 2 or 3 substituents, attached at any available atom to produce a stable compound, wherein the substituents are as described herein.

The term 'nitrile or cyano" can be used interchangeably ands refer to a —CN group.

The term "oxo" refers to a =O atom attached to a saturated or unsaturated (C$_3$-C$_8$) cyclic or a (C$_1$-C$_8$) acyclic moiety. The =O atom can be attached to a carbon, sulfur, and nitrogen atom that is part of the cyclic or acyclic moiety.

The term "amine or amino" refers to an —NR$^d$R$^e$ group wherein R$^d$ and R$^e$ each independently refer to a hydrogen, ($C_1$-$C_8$)alkyl, aryl, heteroaryl, heterocycloalkyl, ($C_1$-$C_8$)haloalkyl, and ($C_1$-$C_6$)hydroxyalkyl group.

The term "amide" refers to a —NR'R"C(O)— group wherein R' and R" each independently refer to a hydrogen, ($C_1$-$C_8$)alkyl, or ($C_3$-$C_6$)aryl.

The term "carboxamido" refers to a —C(O)NR'R" group wherein R' and R" each independently refer to a hydrogen, ($C_1$-$C_8$)alkyl, or ($C_3$-$C_6$)aryl.

The term "aryloxy" refers to an —O-aryl group having the indicated number of carbon atoms. Examples of aryloxy groups include, but are not limited to, phenoxy, napthoxy and cyclopropeneoxy.

The term "haloalkoxy," refers to an —O—($C_1$-$C_6$)alkyl group wherein one or more hydrogen atoms in the $C_1$-$C_8$ alkyl group is replaced with a halogen atom, which can be the same or different. Examples of haloalkyl groups include, but are not limited to, difluoromethoxy, trifluoromethoxy, 2,2,2-trifluoroethoxy, 4-chlorobutoxy, 3-bromopropyloxy, pentachloroethoxy, and 1,1,1-trifluoro-2-bromo-2-chloroethoxy.

The term "hydroxyalkyl," refers to an alkyl group having the indicated number of carbon atoms wherein one or more of the alkyl group's hydrogen atoms is replaced with an —OH group. Examples of hydroxyalkyl groups include, but are not limited to, —CH$_2$OH, —CH$_2$CH$_2$OH, —CH$_2$CH$_2$CH$_2$OH, —CH$_2$CH$_2$CH$_2$CH$_2$OH, —CH$_2$CH$_2$CH$_2$CH$_2$CH$_2$OH, —CH$_2$CH$_2$CH$_2$CH$_2$CH$_2$CH$_2$OH, and branched versions thereof.

The term "alkylsulfonyl" refers to a ($C_1$-$C_6$)alkyl group wherein one or more hydrogen atoms in the $C_1$-$C_6$ alkyl group is replaced with a —S(O)$_a$ group. Subscript "a" can either be 1 or 2, so as to give an alkyl sulfoxide (sulfinyl group), or an alkyl sulfone respectively. Examples of alkylsulfonyl groups include, but are not limited to dimethylsulfoxide, ethylmethyl sulfoxide, and methylvinylsulfone.

The term "haloalkyl," refers to an ($C_1$-$C_6$)alkyl group wherein one or more hydrogen atoms in the $C_1$-$C_6$ alkyl group is replaced with a halogen atom, which can be the same or different. Examples of haloalkyl groups include, but are not limited to, difluoromethyl, trifluoromethyl, 2,2,2-trifluoroethyl, 4-chlorobutyl, 3-bromopropylyl, pentachloroethyl, and 1,1,1-trifluoro-2-bromo-2-chloroethyl.

The term "aminoalkyl," refers to an ($C_1$-$C_6$)alkyl group wherein one or more hydrogen atoms in the $C_1$-$C_6$ alkyl group is replaced with a —NR$^d$R$^e$ group, where R$^d$ and R$^e$ can be the same or different, for example, R$^d$ and R$^e$ each independently refer to a hydrogen, ($C_1$-$C_8$)alkyl, aryl, heteroaryl, heterocycloalkyl, ($C_1$-$C_8$)haloalkyl, and ($C_1$-$C_6$)hydroxyalkyl group. Examples of aminoalkyl groups include, but are not limited to, aminomethyl, aminoethyl, 4-aminobutyl and 3-aminobutylyl.

The term "thioalkyl" or "alkylthio" refers to a ($C_1$-$C_6$) alkyl group wherein one or more hydrogen atoms in the $C_1$-$C_6$ alkyl group is replaced with a —SR group, wherein R$^j$ is selected from the group consisting of hydrogen, ($C_1$-$C_6$) alkyl and ($C_3$-$C_{14}$)aryl.

"Amino ($C_1$-$C_6$)alkylene" refers to a divalent alkylene wherein one or more hydrogen atoms in the $C_1$-$C_6$ alkylene group is replaced with a —NR$^d$R$^e$ group. Examples of amino ($C_1$-$C_6$)alkylene include, but are not limited to, aminomethylene, aminoethylene, 4-aminobutylene and 3-aminobutylylene.

The term "sulfonamide" refers to an —NR$^g$S(O)$_2$R$^h$ group where R$^g$ and R$^h$ each independently refer to a hydrogen, ($C_1$-$C_8$)alkyl, aryl, heteroaryl, heterocycloalkyl, ($C_1$-$C_8$)haloalkyl, and a ($C_1$-$C_6$)hydroxyalkyl group.

A "hydroxyl" or "hydroxy" refers to an —OH group.

The term "hydrophobic group" as used herein refers to one or any combination of chemical moieties described herein that generally do not form hydrogen bonds, such as with water.

The term "hydrophilic group" as used herein refers to one or any combination of chemical moieties described herein that generally form hydrogen bonds, such as with water.

Method of Treating a Subterranean Formation

One embodiment of the present invention is a method of treating a subterranean formation, comprising contacting the formation with the composition comprising one or more compounds conforming to Formula I:

(I)

Formula I Compounds

In various embodiments, Formula I generally possesses structural characteristics of a surfactant, one end of which is polar and hydrophilic as represented by HG-(X)$_m$(X)$_n$—, the other end comparatively non-polar and hydrophobic as represented by Y. Disposed between the two ends is a linker L that comprises at least one bond that is cleavable under conditions described in more detail below.

In some embodiments, the headgroup HG comprises one anionic group. In other embodiments, HG comprises at least two anionic groups. The anionic group in each instance is selected from the group consisting of a sulfate, a sulfonate, a phosphate, and a carboxlate. According to some embodiments, HG thus is one or more anionic groups bound to a straight or branched alkyl, alkenyl, alkynyl as defined herein.

Each anionic group is charge-balanced by an appropriate number of cations. For instance, in some embodiments, the cation is selected from Group I metal ions such as Li$^+$, Na$^+$ and K$^+$; Group II metal ions such as Mg$^{2+}$, Ca$^{2+}$; and quaternary ammonium ions NR$^{4+}$ where R is $C_{1-6}$-alkyl.

Examples of HG moieties comprising anionic groups include but are not limited to -alkyl-SO$_4^{2-}$, -alkyl-SO$_3^-$, -alkyl-PO$_4^{3-}$, -alkyl-CO$_2^-$, -heteroalkyl-SO$_4^{2-}$, -heteroalkyl-SO$_3^-$, -heteroalkyl-PO$_4^{3-}$, and -heteroalkyl-CO$_2^-$.

In other embodiments, the headgroup HG comprises one cationic group. In other embodiments, HG comprises at least two cationic groups. The cationic group in each instance is selected from a quaternary ammonium of the formula —[NR$^1$R$^2$R$^3$]+ and phosphonium of the formula —[PR$^1$R$^2$R$^3$]$^+$. The substituents R$^1$, R$^2$, and R$^3$, are independently selected from alkyl, alkenyl, and alkynyl. Alternatively, or in addition, the cationic group is an N-alkyl pyridinium or N-alkyl imidazolium, where alkyl is defined herein. Exemplary cationic groups according to some embodiments include but are not limited to —N(alkyl)$_3$ such as —N(Me)$_3^+$ and —N(Et$_3$)$^+$, and —P(alkyl)$_3$ such as —P(Me)$_3^+$ and —P(Et$_3$)$^+$.

Each cationic group is charge-balanced by an appropriate number of anions. For instance, in some embodiments the anion is selected from F$^-$, Cl$^-$, Br$^-$, and I$^-$. In other embodiments, the anion is selected from OH$^-$, CN$^-$, SCN$^-$, OAc$^-$, ClO$^-$, ClO$_2^-$, ClO$_3^-$, ClO$_4^-$, NO$_2^-$, NO$_3^-$, MnO$_4^-$, CO$_3^{2-}$, C$_2$O$_4^{2-}$ (oxalate), CrO$_4^{2-}$, Cr$_2$O$_7^{2-}$, SO$_3^{2-}$, SO$_4^{2-}$, PO$_3^{3-}$, and PO$_4^{3-}$.

Examples of HG moieties comprising cationic groups include but are not limited to -alkyl-[NR$^1$R$^2$R$^3$]$^+$ and -heteroalkyl-$[NR^1R^2R^3]^+$. In some embodiments, HG moieties contain at least two cationic groups that can be bound, for instance, to straight or branched alkyl and straight or branched heteroalkyl.

In Formula I compounds wherein n is 1, X is a hydrophilic divalent moiety disposed between the headgroup HG and linker L. Any suitable hydrophilic moiety known to those skilled in the art will serve this purpose. For instance, in some embodiments X is selected from polyoxyalkylenes, polyoxyalkylene alkyl ethers, polyoxyalkylene alkylphenol ethers, and polyalkylene glycols.

More specific examples of X according to some embodiments are polyalkylene glycols, such as polyethylene and polypropylene glycols. In some embodiments, the number of repeating alkylene-glycol units can range from 1 to 20, 1 to 10, and 1 to 5.

In Formula I compounds wherein n is 0, X is present as a monovalent moiety in one or more instances on HG, i.e., m=1, 2, 3, 4, 5, or 6. Any suitable hydrophilic moiety known to those skilled in the art will serve this purpose. For instance, in some embodiments X is selected from monovalent polyoxyalkylenes, polyoxyalkylene alkyl ethers, polyoxyalkylene alkylphenol ethers, and polyalkylene glycols. In another embodiment, X is a hydroxyalkyl.

In Formula I compounds, Y is a hydrophobic group. According to some embodiments, Y is any suitable moiety exhibiting typical hydrophobic properties known to those who are skilled in the art. For instance, in some embodiments Y is a hydrocarbyl group, such as a linear or branched $C_8$-$C_{50}$-alkyl, linear or branched $C_8$-$C_{50}$-alkenyl, or linear or branched $C_8$-$C_{50}$-alkynyl. In other embodiments, the hydrophobic group is a fluorohydrocarbyl group, wherein the hydrocarbyl moiety as defined above is substituted with one or more fluoro substituents. In still other embodiments, Y is a siloxane of the general formula —$(OSiR^1R^2)_n$—, wherein $R^1$ and $R^2$ are independently from alkyl, alkenyl, and alkynyl and n is an integer selected from 1-20, 1-10, and 1-5.

In Formula I, the fragment HG-X— and —Y are linked by a linker L. Any suitable linker is appropriate so long as it contains a cleavable bond as defined in more detail below. In various embodiments satisfying these indicia, the linker is selected from an ester, a thioester, a phosphodiester, a hydrazone, a disulfide, a thiosulfonate, a dialkyl- or diarylalkoxysilane, an orthoester, an acetal, a ketal, a phosphoramidate, a vinyl ether, an imine, an aconityl, a trityl, and a β-thiopropionate. According to one embodiment, L is an ester.

The cleavable bond in linker L is one susceptible to lability under certain conditions. For instance, in some embodiments, bond rupture can occur by hydrolysis, such as acid- or base-catalyzed hydrolysis. One embodiment in this regard provides for L as an ester, which can be readily hydrolyzed by contact with an acid, such as a mineral acid, e.g., HCl, entrained with any fluid described herein.

Illustrative of structural and functional features of Formula I compounds described herein, according to one embodiment, is the following compound:

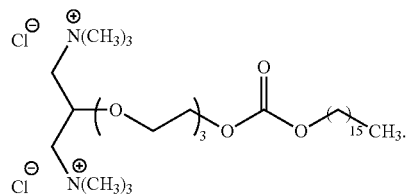

Method

In some embodiments, Formula I compounds are used in a fluid composition comprising one or more compounds described herein. Thus, in various embodiments, the concentration of a Formula I compound in the composition is one in the range of about 0.1 wt % to about 80 wt %, or about 1 wt % to about 50 wt %, or about 1 wt % or more of the composition, or about 2 wt %, 3, 4, 5, 10, 15, 20, 25, 30, 40, 50, 60, 70, 80, 85, 90, 91, 92, 93, 94, 95, 96, 97, 98, 99, 99.9, or about 99.99 wt % or more.

In other embodiments, the pH of a Formula I compound fluid composition can vary. For instance, the pH is less than about 7, less than about 6, less than about 5, less than about 4, less than about 3, less than about 2, and less than about 1. In an exemplary embodiment, the pH is less than about 1. pH of the fluid composition can be adjusted by the addition of any suitable acid.

For instance, according to some embodiments, the acid is one or more mineral acids such as hydrochloric acid. Other suitable acids include but are not limited to sulfuric acid and phosphoric acid. The concentration of the acid in the fluid composition can be any suitable concentration, such as about 0.1 wt % to about 99.9 wt %, or about 1 wt % to about 99 wt %, or about 0.1 wt % or less, or about 0.5 wt %, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 42, 44, 46, 48, 50, 55, 60, 65, 70, 75, 80, 85, 86, 87, 88, 89, 90, 91, 92, 93, 94, 95, 96, 97, 98, 99, 99.5, 99.9, or about 99.99 wt % or higher.

In other embodiments, the fluid composition comprises a carrier fluid. Any suitable proportion of the composition can be one or more downhole fluids or one or more carrier fluids. In some embodiments about 0.001 wt % to about 99.999 wt % of the composition is a downhole fluid or carrier liquid, or about 0.1 wt % to about 80 wt %, or about 1 wt % to about 50 wt %, or about 1 wt % or more of the composition, or about 2 wt %, 3, 4, 5, 10, 15, 20, 25, 30, 40, 50, 60, 70, 80, 85, 90, 91, 92, 93, 94, 95, 96, 97, 98, 99, 99.9, or about 99.99 wt % or more.

In some embodiments, the composition is used in well completion operations, such as primary proppant treatments for immobilizing proppant particulates (e.g., hydraulic fracturing, gravel packing, and frac-packing), remedial proppant/gravel treatments, near-wellbore formation sand consolidation treatments for sand control, consolidating-while-drilling target intervals, and plugging-and-abandonment of wellbores in subterranean formations.

In another embodiment, the method further includes placing the composition in a subterranean formation. The placing of the composition in the subterranean formation can include contacting the composition and any suitable part of the subterranean formation, or contacting the composition and a subterranean material, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. The placing of the composition in the subterranean formation can include at least partially depositing the composition in a fracture, flow pathway, or area surrounding the same.

In still another embodiment, the method further comprises hydraulic fracturing, such as a method of hydraulic fracturing to generate a fracture or flow pathway. The placing of the composition in the subterranean formation or the contacting of the subterranean formation and the hydraulic fracturing can occur at any time with respect to one another; for example, the hydraulic fracturing occurs before, during, and/or after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed or contacted, or the composition is placed or contacted to an area surrounding the generated fracture or flow pathway.

In one embodiment, the fluid composition comprises a carrier fluid. Any suitable proportion of the composition can be one or more downhole fluids or one or more carrier fluids. In some embodiments about 0.001 wt % to about 99.999 wt % of the composition is a downhole fluid or carrier liquid, or about 0.1 wt % to about 80 wt %, or about 1 wt % to about 50 wt %, or about 1 wt % or more of the composition, or about 2 wt %, 3, 4, 5, 10, 15, 20, 25, 30, 40, 50, 60, 70, 80, 85, 90, 91, 92, 93, 94, 95, 96, 97, 98, 99, 99.9, or about 99.99 wt % or more.

One advantage of Formula I compositions, such as in embodiments where Formula I compounds are used in fracturing fluids, is that the hydrophilic headgroup HG moieties of the compounds strongly adsorb to formation faces as they are formed, thereby exposing a strongly hydrophobic moiety to the interior of the formation. The coated fracture faces in this regard repel water and, accordingly, promote increased fracture fluid efficiency by preventing loss of the fluid through fracture faces.

Another advantage according to various embodiments resides in the cleavable bond of linker L. Once cleaved such as by hydrolysis in reservoir conditions, by fracturing fluid pH adjustment, or by breaker fluid, the hydrophobic Y moiety is released and free to migrate with fluid flow. The hydrophilic HG-X moiety thus remains on the fracture face, effectively wetting the face, and thereby promoting the production of broken aqueous fracturing fluid.

Still another advantage according to various embodiments is the flexibility of selecting one or multiple cationic or anionic groups in head group HG. For instance, in one embodiment wherein HG comprises one cationic group, a Formula I compound can behave like traditional surfactant in that it can be ion-exchanged with other cations such as sodium ion, thereby allowing a Formula I compound or the adsorbed HG-X portion thereof to eventually be removed from a fracture face.

Alternatively, according to other embodiments, HG can comprise two or more cationic groups, for instance. An advantage of an HG containing multiple cationic groups is that a Formula I compound or adsorbed HG-X moiety can be resistant to removal by ion exchange. Another advantage of the polycationic Formula I compounds is their provision of clay and formation face stabilization. In this context, the compound can attenuate deleterious effects of water-based fracturing fluids upon water-sensitive shale formations having high clay content: these effects include clay swelling, dispersion, and flocculation, wherein failure to prevent any such effects can lead to fracture-face softening and sloughing, resulting in significant loss of fracture conductivity.

Other Components

In accordance with some embodiments, the additive is selected from the group consisting of breakers, density modifiers, emulsifiers, dispersants, polymeric stabilizers, crosslinking agents, antioxidants, heat stabilizers, surfactants, scale inhibitors, enzymes, and combinations thereof. More specific descriptions of these additives follow.

In some embodiments, the composition further comprises a hydrolyzable ester. The hydrolyzable ester is any suitable hydrolyzable ester. For example, the hydrolyzable ester is a $C_1$-$C_5$ mono-, di-, tri-, or tetra-alkyl ester of a $C_2$-$C_{40}$ mono-, di-, tri-, or tetra-carboxylic acid. The hydrolyzable ester is one of dimethylglutarate, dimethyladipate, dimethylsuccinate, sorbitol, catechol, dimethylthiolate, methyl salicylate, dimethylsalicylate, and tert-butylhydroperoxide. Any suitable wt % of the composition or a cured product thereof is the hydrolyzable ester, such as about 0.01 wt % to about 20 wt %, or about 0.1 wt % to about 5 wt %, or about 0.01 wt % or less, or about 0.1 wt %, 1, 2, 3, 4, 5, 6, 8, 10, 12, 14, 16, 18, or about 20 wt % or more.

In other embodiments, the composition comprises at least one tackifier. The tackifier can be any suitable wt % of the composition or cured product thereof, such as about 0.001 wt % to about 50 wt %, about 0.01 wt % to about 30 wt %, or about 0.001 wt % or less, or about 0.01 wt %, 0.1, 1, 2, 3, 4, 5, 10, 15, 20, 25, 30, 35, 40, 45, or about 50 wt % or more. The tackifier is any suitable material having tackiness. For example, the tackifier is an adhesive or a resin. The term "resin" as used herein refers to any of numerous physically similar polymerized synthetics or chemically modified natural resins including thermoplastic materials and thermosetting materials. In some embodiments, the tackifier is at least one of a shellac, a polyamide, a silyl-modified polyamide, a polyester, a polycarbonate, a polycarbamate, a urethane, a natural resin, an epoxy-based resin, a furan-based resin, a phenolic-based resin, a urea-aldehyde resin, and a phenol/phenol formaldehyde/furfuryl alcohol resin.

In some embodiments, the tackifier is one of bisphenol A diglycidyl ether resin, butoxymethyl butyl glycidyl ether resin, bisphenol A-epichlorohydrin resin, and bisphenol F resin. In other embodiments, the tackifier is one of an acrylic acid polymer, an acrylic acid ester polymer, an acrylic acid homopolymer, an acrylic acid ester homopolymer, poly (methyl acrylate), poly(butyl acrylate), poly(2-ethylhexyl acrylate), an acrylic acid ester copolymer, a methacrylic acid derivative polymer, a methacrylic acid homopolymer, a methacrylic acid ester homopolymer, poly(methyl methacrylate), poly(butyl methacrylate), poly(2-ethylhexyl methacrylate), an acrylamidomethylpropane sulfonate polymer or copolymer or derivative thereof, and an acrylic acid/acrylamidomethylpropane sulfonate copolymer. In still other embodiments, the tackifier is a trimer acid, a fatty acid, a fatty acid-derivative, maleic anhydride, acrylic acid, a polyester, a polycarbonate, a polycarbamate, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, a silyl-modified polyamide, and a condensation reaction product of a polyacid and a polyamine.

In some embodiments, the tackifier includes an amine-containing polymer and/or is hydrophobically-modified. In some embodiments, the tackifier includes one of a polyamine (e.g., spermidine and spermine), a polyimine (e.g., poly(ethylene imine) and poly(propylene imine)), a polyamide, poly(2-(N,N-dimethylamino)ethyl methacrylate), poly(2-(N,N-diethylamino)ethyl methacrylate), poly(vinyl imidazole), and a copolymer including monomers of at least one of the foregoing and monomers of at least one non-amine-containing polymer such as of at least one of polyethylene, polypropylene, polyethylene oxide, polypropylene oxide, polyvinylpyridine, polyacrylic acid, polyacrylate, and polymethacrylate. The hydrophobic modification is any suitable hydrophobic modification, such as at least one $C_4$-$C_{30}$ hydrocarbyl including at least one of a straight chain, a branched chain, an unsaturated C—C bond, an aryl group, and any combination thereof.

In some embodiments, the composition includes one or more viscosifiers. The viscosifier provides an increased viscosity of the composition before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000.1 wt % to about 10 wt % of the composition or a cured product thereof, about 0.004 wt % to about 0.01 wt %, or about 0.000.1 wt % or less, 0.000.5 wt %, 0.001, 0.005, 0.01, 0.05, 0.1, 0.5, 1, 2, 3, 4, 5, 6, 7, 8, 9, or about 10 wt % or more.

The viscosifier includes at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. Exemplary viscosifiers include a polymer including at least one monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$)alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, welan, derivatized starch, tamarind, tragacanth, guar gum, derivatized guar (e.g., hydroxypropyl guar, carboxy methyl guar, or carboxymethyl hydroxypropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier is at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstitued ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropane-sulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly(vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In some embodiments, the composition comprises one or more breakers. The breaker is any suitable breaker, such that the surrounding fluid (e.g., a fracturing fluid) is at least partially broken for more complete and more efficient recovery thereof, such as at the conclusion of the hydraulic fracturing treatment. In some embodiments, the breaker is encapsulated or otherwise formulated to give a delayed-release or a time-release breaker, such that the surrounding liquid remains viscous for a suitable amount of time prior to breaking. The breaker is any suitable breaker; such as a compound that includes a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker is at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al_3^+$ salt of a persulfate, percarbonate, perborate, peroxide, perphosphate, permanganate, chlorite, or hyperchlorite ion. An enzymatic breaker is at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the composition, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

In accordance with one embodiment, the composition comprises any suitable fluid in addition to those otherwise described herein. For example, the fluid is at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid constitutes about 0.001 wt % to about 99.999 wt % of the composition or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In other embodiments, the composition comprises a downhole fluid. The composition can be combined with any suitable downhole fluid before, during, or after the placement of the composition in the subterranean formation or the contacting of the composition and the subterranean material. In some examples, the composition is combined with a downhole fluid above the surface, and then the combined composition is placed in a subterranean formation or contacted with a subterranean material. In another example, the composition is injected into a subterranean formation to combine with a downhole fluid, and the combined composition is contacted with a subterranean material or is considered to be placed in the subterranean formation.

In some embodiments, the downhole fluid is an aqueous or oil-based fluid including a fracturing fluid, spotting fluid, clean-up fluid, completion fluid, remedial treatment fluid, abandonment fluid, pill, cementing fluid, packer fluid, or a combination thereof. The placement of the composition in the subterranean formation can include contacting the subterranean material and the mixture. The downhole fluid constitutes any suitable weight percent of the composition, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt %.

In some embodiments, the composition includes an amount of any suitable material used in a downhole fluid. For example, the composition includes water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts, fibers, thixotropic additives, breakers, crosslinkers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, pozzolan lime, or a combination thereof.

In various embodiments, the composition or a mixture including the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the composition or a mixture including the same can include one or more additive components such as: X-TEND® II, PAC™-R, PAC™-L, LIQUI-VIS® EP, BRINEDRIL-VIS™, BARAZAN®, N-VIS®, and AQUAGEL® viscosifiers; THERMA-CHEK®, N-DRIL™, N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUDLUBE®, and DRIL-N-SLIDE™ lubricants; QUIK-THIN®, IRON-THIN™, and ENVIRO-THIN™ thinners; SOURSCAV™ scavenger; BARACOR® corrosion inhibitor; and WALL-NUT®, SWEEP-WATE®, STOPPIT™, PLUG-GIT®, BARACARB®, DUO-SQUEEZE®, BAROFIBRE™, STEELSEAL®, and HYDRO-PLUG® lost circulation management materials. Any suitable proportion of the composition or mixture including the composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture.

A cement fluid includes an aqueous mixture cement and/or cement kiln dust. The composition including the aryl component and the amine or epoxide component, or a cured product thereof, can form a useful combination with cement or cement kiln dust. The cement kiln dust is any suitable cement kiln dust. Cement kiln dust is formed during the manufacture of cement and can be partially calcined kiln feed that is removed from the gas stream and collected in a dust collector during a manufacturing process. Cement kiln dust is advantageously utilized in a cost-effective manner since kiln dust is often regarded as a low value waste product of the cement industry. Some embodiments of the cement fluid include cement kiln dust but no cement, cement kiln dust and cement, or cement but no cement kiln dust. The cement is any suitable cement. The cement can be a hydraulic cement, for instance. A variety of cements can be utilized in accordance with embodiments of the present invention; for example, those including calcium, aluminum, silicon, oxygen, iron, or sulfur, which can set and harden by reaction with water. Other suitable cements include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Optionally, other additives are added to a cement or kiln dust-containing composition of embodiments of the present invention as deemed appropriate by one skilled in the art, with the benefit of this disclosure. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives include crystalline silica compounds, amorphous silica, salts, fibers, hydratable clays, microspheres, pozzolan lime, thixotropic additives, and combinations thereof.

In accordance with another embodiment, the composition described herein comprises a binder. For instance, the binder is selected from the group consisting of hydrated aluminum-containing binders, titanium dioxide, hydrated titanium dioxide, clay minerals, alkoxysilanes, amphiphilic substances, graphite, and combinations thereof. Further examples of suitable binders include hydrated alumina or other aluminum-containing binders, mixtures of silicon and aluminum compounds such as disclosed in WO 94/13584); and silicon compounds.

Still further examples binders suitable for use in the invention include oxides of silicon, aluminum, boron, phosphorus, zirconium, and/or titanium. An illustrative binder, according to one embodiment, is silica, where the $SiO_2$ subunit is introduced into a shaping step as a silica sol or in the form of tetraalkoxysilanes, such in the formation of the shaped bodies described herein. Still further examples of binders include oxides of magnesium and of beryllium and clays, such as montmorillonites, kaolins, bentonites, halloysites, dickites, nacrites and anauxites. Tetraalkoxysilanes also are suitable for use as binders in the present invention. Specific examples include tetramethoxysilane, tetraethoxysilane, tetrapropoxysilane and tetrabutoxysilane. Tetraalkoxytitanium and tetraalkoxyzirconium compounds and trimethoxy-, triethoxy-, tripropoxy- and tributoxy-aluminum, tetramethoxysilane and tetraethoxysilane are still further examples of suitable binders.

System

In accordance with an embodiment, the invention provides a system that uses or that can be generated by use of an embodiment of the composition described herein in a subterranean formation, or that can perform or be generated by performance of a method for using the composition described herein. For instance, the system includes a composition and a subterranean formation including the composition therein. In some embodiments, the composition in the system includes a downhole fluid, or the system comprises a mixture of the composition and downhole fluid. In other embodiments, the system comprises a tubular and a pump configured to pump the composition into the subterranean formation through the tubular.

Some embodiments provide a system configured for delivering the composition described herein to a subterranean location and for using the composition therein, such as for a fracturing operation (e.g., pre-pad, pad, slurry, or finishing stages). In some embodiments, the system or apparatus includes a pump fluidly coupled to a tubular (e.g., any suitable type of oilfield pipe, such as pipeline, drill pipe, production tubing, and the like), the tubular containing a composition as described herein.

In some embodiments, the system comprises a drillstring disposed in a wellbore, the drillstring including a drill bit at a downhole end of the drillstring. The system can also include an annulus between the drillstring and the wellbore. Further, in accordance with one embodiment, the system includes a pump configured to circulate the composition through the drill string, through the drill bit, and back above-surface through the annulus. In some embodiments, the system includes a fluid processing unit configured to process the composition exiting the annulus to generate a cleaned drilling fluid for recirculation through the wellbore.

The pump is a high pressure pump in some embodiments. As used herein, the term "high pressure pump" refers to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps are known to one having ordinary skill in the art and can include floating piston pumps and positive displacement pumps.

In other embodiments, the pump is a low pressure pump. As used herein, the term "low pressure pump" refers to a pump that operates at a pressure of about 1000 psi or less. In some embodiments, a low pressure pump can be fluidly coupled to a high pressure pump that is fluidly coupled to the tubular. That is, in such embodiments, the low pressure pump is configured to convey the composition to the high pressure pump. In such embodiments, the low pressure pump can "step up" the pressure of the composition before it reaches the high pressure pump.

In some embodiments, the system described herein further includes a mixing tank that is upstream of the pump and in which the composition is formulated. In various embodiments, the pump (e.g., a low pressure pump, a high pressure pump, or a combination thereof) conveys the composition from the mixing tank or other source of the composition to the tubular. In other embodiments, however, the composition e formulated offsite and transported to a worksite, in which case the composition is introduced to the tubular via the pump directly from its shipping container (e.g., a truck, a railcar, a barge, or the like) or from a transport pipeline. In either case, the composition is drawn into the pump, elevated to an appropriate pressure, and then introduced into the tubular for delivery to the subterranean formation.

With reference to FIG. 1, the composition directly or indirectly affects one or more components or pieces of equipment associated with a wellbore drilling assembly 100, according to one or more embodiments. While FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

The composition may be added to, among other things, a drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the composition is added to, among other things, a drilling fluid 122 at any other location in the drilling assembly 100. In at least one embodiment, for example, there is more than one retention pit 132, such as multiple retention pits 132 in series. Moreover, the retention pit 132 can represent one or more fluid storage facilities and/or units where the composition may be stored, reconditioned, and/or regulated until added to a drilling fluid 122.

As mentioned above, the composition may directly or indirectly affect the components and equipment of the drilling assembly 100. For example, the composition may directly or indirectly affect the fluid processing unit(s) 128, which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used to store, monitor, regulate, and/or recondition the composition.

The composition may directly or indirectly affect the pump 120, which is intended to represent one or more of any conduits, pipelines, trucks, tubulars, and/or pipes used to fluidically convey the composition downhole, any pumps, compressors, or motors (e.g., topside or downhole) used to drive the composition into motion, any valves or related joints used to regulate the pressure or flow rate of the composition, and any sensors (e.g., pressure, temperature, flow rate, and the like), gauges, and/or combinations thereof, and the like. The composition may also directly or indirectly affect the mixing hopper 134 and the retention pit 132 and their assorted variations.

The composition can also directly or indirectly affect various downhole equipment and tools that comes into contact with the composition such as, but not limited to, the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The composition may also directly or indirectly affect any downhole heat exchangers, valves and corresponding actuation devices, tool seals, packers and other wellbore isolation devices or components, and the like associated with the wellbore 116.

While not specifically illustrated herein, the composition may also directly or indirectly affect any transport or delivery equipment used to convey the composition to the drilling assembly 100 such as, for example, any transport vessels, conduits, pipelines, trucks, tubulars, and/or pipes used to fluidically move the composition from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

Figure 2:
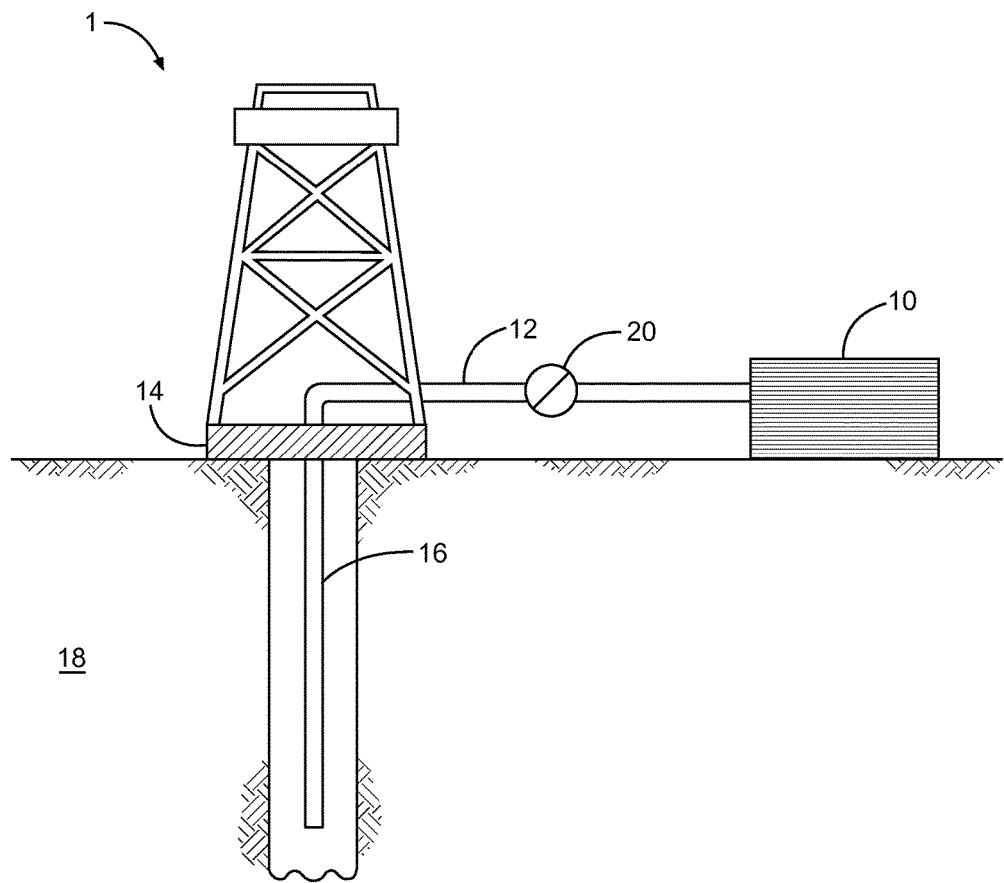
FIG. 2 illustrates a system for delivering a composition to a subterranean formation in accordance with various embodiments.

FIG. 2 shows an illustrative schematic of systems that can deliver embodiments of the compositions of the present invention to a subterranean location, according to one or more embodiments. It should be noted that while FIG. 2 generally depicts a land-based system or apparatus, like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the composition can, in some embodiments, flow back to wellhead 14 and exit subterranean formation 18. The composition that flows back can be substantially diminished in the concentration of various components therein. In some embodiments, the composition that has flowed back to wellhead 14 can subsequently be recovered, and in some examples reformulated, and recirculated to subterranean formation 18.

The composition of the invention can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Additional Embodiments

The following exemplary embodiments are provided, the numbering of which is not to be construed as designating levels of importance.

Embodiment 1 is a method of treating a subterranean formation, the method comprising contacting the formation with a fluid composition comprising a compound according to Formula I:

wherein
HG is a headgroup comprising at least one anionic group or at least one cationic group;
X is a hydrophilic group;
L is a linker comprising at least one cleavable bond;
Y is a hydrophobic group
m is an integer selected from 0, 1, 2, 3, 4, 5, and 6; and
n is 0 or 1.

Embodiment 2 relates to embodiment 1, wherein HG comprises at least one anionic group.

Embodiment 3 relates to embodiment 2, wherein the anionic group is selected from the group consisting of a sulfate, a sulfonate, a phosphate, a carboxlate, and combinations thereof.

Embodiment 4 relates to embodiment 1, wherein HG comprises at least one cationic group.

Embodiment 5 relates to embodiment 4, wherein the cationic group is selected from the group consisting of a quaternary ammonium, an N-alkyl pyridinium, and an N-alkyl imidazolium.

Embodiment 6 relates to embodiment 1, wherein HG comprises two or more anionic groups or two or more cationic groups.

Embodiment 7 relates to embodiment 1, wherein n is 0.

Embodiment 8 relates to embodiment 7, wherein m is selected from 1, 2, 3, 4, 5, and 6.

Embodiment 9 relates to embodiment 1, wherein n is 1.

Embodiment 10 relates to embodiment 9, wherein m is 0.

Embodiment 11 relates to any one of embodiments 1-10, wherein X is selected from polyoxyalkylenes, polyoxyalkylene alkyl ethers, polyoxyalkylene alkylphenol ethers, polyalkylene glycols, and hydroxyalkyl.

Embodiment 12 relates to embodiment 11, wherein X is a polyoxyalkylene.

Embodiment 13 relates to embodiment 12, wherein the polyoxyalkylene is a polyoxyethylene or a polyoxypropylene.

Embodiment 14 relates to any one of embodiments 1-13, wherein Y is selected from a hydrocarbyl group, a fluorohydrocarbyl group, and a siloxane group.

Embodiment 15 relates to embodiment 14, wherein Y is a hydrocarbyl group.

Embodiment 16 relates to embodiment 15, wherein the hydrocarbyl group is a linear or branched $C_8$-$C_{50}$-alkyl, linear or branched $C_8$-$C_{50}$-alkenyl, or linear or branched $C_8$-$C_{50}$-alkynyl.

Embodiment 17 relates to any one of embodiments 1-16, wherein L is selected from the group consisting of an ester, thioester, a phosphodiester, a hydrazone, a disulfide, a thiosulfonate, a dialkyl- or diarylalkoxysilane, an orthoester, an acetal, a ketal, a phosphoramidate, a vinyl ether, an imine, an aconityl, a trityl, and a β-thiopropionate.

Embodiment 18 relates to embodiment 17, wherein L is an ester.

Embodiment 19 relates to embodiment 18, wherein X is a polyoxyethylene.

Embodiment 20 relates to embodiment 19, wherein Y is a linear or branched $C_8$-$C_{50}$-alkyl.

Embodiment 21 relates to embodiment 18, wherein X is hydroxyalkyl.

Embodiment 22 relates to embodiment 1, wherein the compound according to Formula I is:

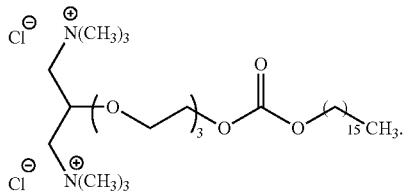

Embodiment 23 relates to embodiment 1, wherein the compound according to Formula I is:

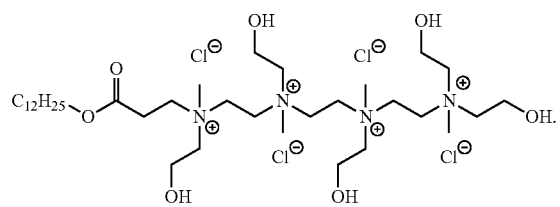

Embodiment 24 relates to any one of embodiments 1-23, wherein the contacting comprises placing the composition in at least one of a fracture and flowpath in the subterranean formation.

Embodiment 25 relates to any one of embodiments 1-24, wherein the fracture is present in the subterranean formation at the time when the composition is contacted with the subterranean formation.

Embodiment 26 relates to any one of embodiments 24 or 25, wherein the method further comprises forming the fracture or flowpath.

Embodiment 27 relates to any one of embodiments 1-26, further comprising fracturing the subterranean formation to form at least one fracture in the subterranean formation.

Embodiment 28 relates to any one of embodiments 1-27, wherein the composition further comprises a carrier fluid.

Embodiment 29 relates to any one of embodiments 1-28, wherein the compound according to Formula I is present in an amount of about 0.01 wt % to about 30 wt % based upon the total weight of the composition.

Embodiment 30 relates to any one of embodiments 1-29, wherein the compound according to Formula I is present in an amount of about 0.1 wt % to about 10 wt %.

Embodiment 31 relates to any one of embodiments 1-30, further comprising combining the composition with an aqueous or oil-based fluid comprising a fracturing fluid, spotting fluid, clean-up fluid, completion fluid, remedial treatment fluid, abandonment fluid, pill, cementing fluid, packer fluid, logging fluid, or a combination thereof.

Embodiment 32 relates to any one of embodiments 1-31, wherein the contacting occurs in a formation matrix of the subterranean formation.

Embodiment 33 relates to any one of embodiments 1-32, further comprising a subsequent step of contacting the formation with a fluid having pH sufficient to cleave the bond in the linker L, whereby the cleavable bond is cleaved.

Embodiment 34 relates to embodiments 33, wherein the pH of the fluid is less than about 6, less than about 5, less than about 4, less than about 3, less than about 2, or less than about 1.

Embodiment 35 relates to embodiments 34, wherein the pH is less than about 2.

Embodiment 36 relates to embodiments 33, wherein the fluid is a fracturing fluid.

Embodiment 37 is a system for treating a subterranean formation, comprising a fluid composition comprising
a compound according to Formula I:

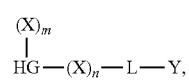

wherein
HG is a headgroup comprising at least one anionic group or at least one cationic group;
X is a hydrophilic group;
L is a linker comprising at least one cleavable bond;
Y is a hydrophobic group
m is an integer selected from 0, 1, 2, 3, 4, 5, and 6; and
n is 0 or 1;
a tubular disposed in the subterranean formation; and
a pump configured to pump the composition in the subterranean formation through the tubular.

Embodiment 38 is a composition comprising a carrier fluid and a compound according to Formula I:

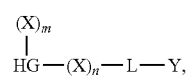

wherein
HG is a headgroup comprising at least one anionic group or at least one cationic group;
X is a hydrophilic group;
L is a linker comprising at least one cleavable bond;
Y is a hydrophobic group
m is an integer selected from 0, 1, 2, 3, 4, 5, and 6; and
n is 0 or 1.

Embodiment 39 relates to embodiment 38, wherein HG comprises at least one anionic group.

Embodiment 40 relates to embodiment 39, wherein the anionic group is selected from the group consisting of a sulfate, a sulfonate, a phosphate, a carboxlate, and combinations thereof.

Embodiment 41 relates to embodiment 38, wherein HG comprises at least one cationic group.

Embodiment 42 relates to embodiment 41, wherein the cationic group is selected from the group consisting of a quaternary ammonium, an N-alkyl pyridinium, and an N-alkyl imidazolium.

Embodiment 43 relates to embodiment 38, wherein HG comprises two or more anionic groups or two or more cationic groups.

Embodiment 44 relates to embodiment 38, wherein n is 0.

Embodiment 45 relates to embodiment 44, wherein m is selected from 1, 2, 3, 4, 5, and 6.

Embodiment 46 relates to embodiment 38, wherein n is 1.

Embodiment 47 relates to embodiment 46, wherein m is 0.

Embodiment 48 relates to any one of embodiments 38-47, wherein X is selected from polyoxyalkylenes, polyoxyalkylene alkyl ethers, polyoxyalkylene alkylphenol ethers, polyalkylene glycols, and hydroxyalkyl.

Embodiment 49 relates to embodiment 48 wherein X is a polyoxyalkylene.

Embodiment 50 relates to embodiment 49, wherein the polyoxyalkylene is a polyoxyethylene or a polyoxypropylene.

Embodiment 51 relates to any one of embodiments 38-50, wherein Y is selected from a hydrocarbyl group, a fluorohydrocarbyl group, and a siloxane group.

Embodiment 52 relates to embodiment 51, wherein Y is a hydrocarbyl group.

Embodiment 53 relates to embodiment 52, wherein the hydrocarbyl group is a linear or branched $C_8$-$C_{50}$-alkyl, linear or branched $C_8$-$C_{50}$-alkenyl, or linear or branched $C_8$-$C_{50}$-alkynyl.

Embodiment 54 relates to any one of embodiments 38-53, wherein L is selected from the group consisting of an ester, thioester, a phosphodiester, a hydrazone, a disulfide, a thiosulfonate, a dialkyl- or diarylalkoxysilane, an orthoester, an acetal, a ketal, a phosphoramidate, a vinyl ether, an imine, an aconityl, a trityl, and a 3-thiopropionate.

Embodiment 55 relates to embodiment 54, wherein L is an ester.

Embodiment 56 relates to embodiment 55, wherein X is a polyoxyethylene.

Embodiment 57 relates to embodiment 56, wherein Y is a linear or branched $C_8$-$C_{50}$-alkyl.

Embodiment 58 relates to embodiment 55, wherein X is hydroxyalkyl.

Embodiment 59 relates to embodiment 38, wherein the compound according to Formula I is:

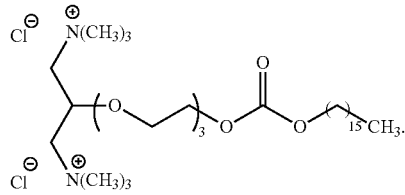

Embodiment 60 relates to embodiment 38, wherein the compound according to Formula I is:

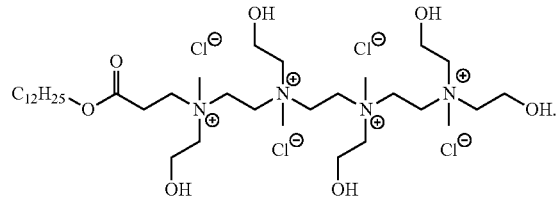

EXAMPLES

The following examples illustrate specific embodiments of the invention. Accordingly, the invention is not limited to the examples given herein.

Example 1: Synthesis of Compound VVB2-107

An exemplary Formula I compound was synthesized utilizing routine synthetic organic methodology according to the reaction sequence shown below. Equimolar amounts of lauryl acrylate (1) and $N^1,N^{1'}$-(ethane-1,2-diyl)bis(ethane-1, 2-diamine) (2) were reacted under classical Michael addition conditions to yield addition product (3).

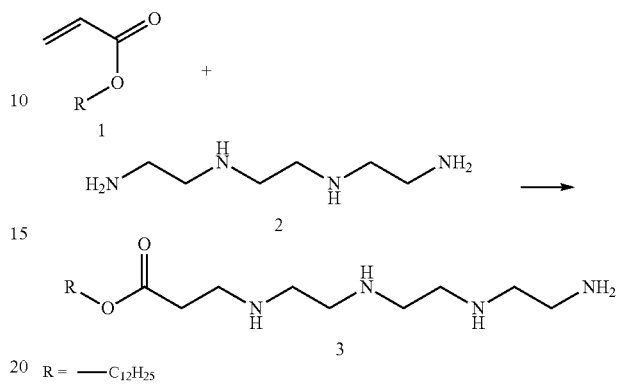

Compound (3) was contacted with a slight excess of ethylene oxide (5.2 equivalents) to give fully epoxidized product (4).

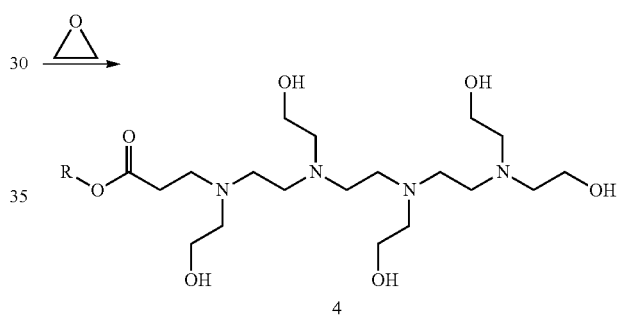

An excess of methyl chloride was added to compound (4) in aqueous solution to fully quaternize the amines, yielding the final product (VVB2-107).

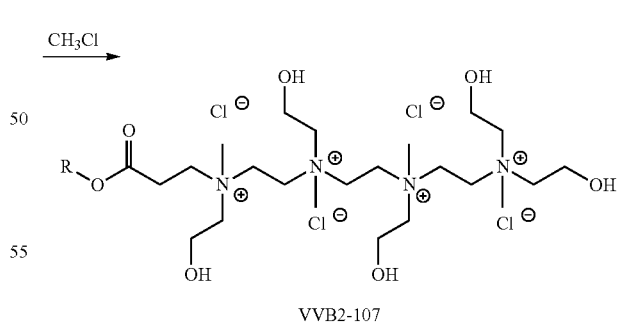

We claim:

1. A method for treating a subterranean formation, comprising:

placing a fluid composition into the subterranean formation, the fluid composition comprises a compound selected from the group consisting of:

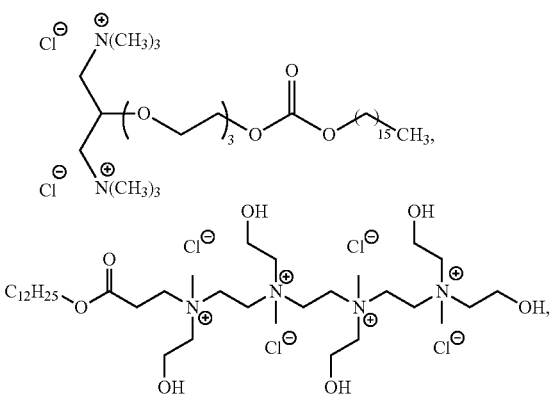

and
combinations thereof.

2. The method of claim 1, wherein the fluid composition comprises:

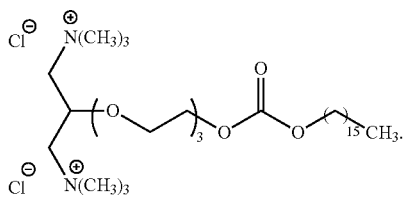

3. The method of claim 1, wherein the fluid composition comprises:

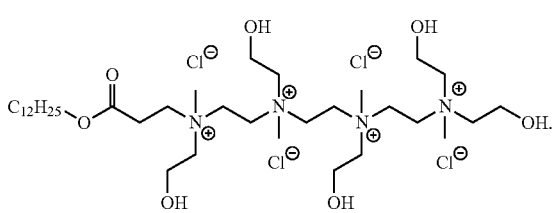

4. The method of claim 1, wherein contacting the subterranean formation comprises placing the fluid composition in at least one of a fracture and flowpath in the subterranean formation.

5. The method of claim 4, wherein the fracture is present in the subterranean formation at the time when the fluid composition is contacted with the subterranean formation.

6. The method of claim 5, wherein the method further comprises forming the fracture or flowpath.

7. The method of claim 1, further comprising fracturing at least a portion of the subterranean formation to form a fracture in the subterranean formation.

8. The method of claim 7, further comprising depositing a proppant into the fracture, and wherein the fluid composition comprises the proppant.

9. The method of claim 8, wherein the proppant comprises a resin.

10. The method of claim 1, wherein the compound comprises about 0.1 wt % to about 10 wt % of the fluid composition.

11. The method of claim 1, further comprising combining the fluid composition with a fracturing fluid.

12. The method of claim 1, wherein contacting the subterranean formation occurs in a formation matrix located in the subterranean formation.

13. The method of claim 1, wherein subsequent to placing the fluid composition into the subterranean formation, the method further comprises:
   contacting the fluid composition with another fluid having a pH sufficient to cleave a bond in a linker group of the compound; and
   cleaving the bond.

14. The method of claim 13, wherein the pH of the fluid is less than 6.

15. The method of claim 14, wherein the pH of the fluid is less than 2.

16. The method of claim 1, wherein placing the composition in the subterranean formation comprises pumping the composition through a drill string disposed in a wellbore within the subterranean formation, through a drill bit at a downhole end of the drill string, and back above-surface through an annulus.

17. The method of claim 16, further comprising processing the composition exiting the annulus with a fluid processing unit to generate a cleaned composition and recirculating the cleaned composition through the wellbore.

18. A method for treating a subterranean formation, comprising:
   placing a fluid composition into the subterranean formation, the fluid composition comprises a proppant and a compound selected from the group consisting of:

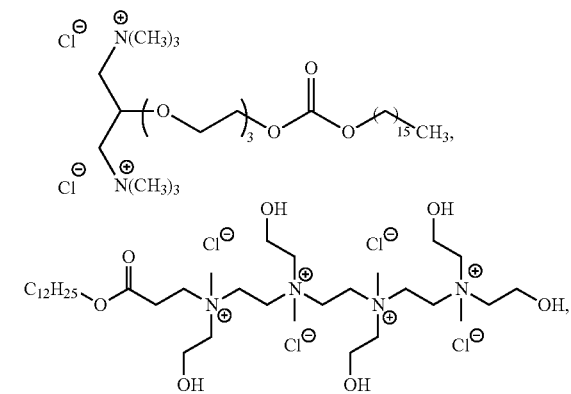

and
combinations thereof; and
fracturing at least a portion of the subterranean formation to form a fracture or flowpath in the subterranean formation.

19. A composition, comprising:
   a carrier fluid; and
   a fluid composition comprising a compound selected from the group consisting of:

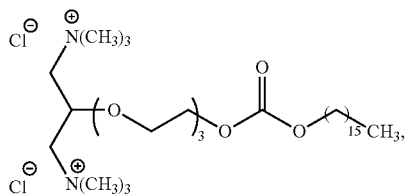

-continued
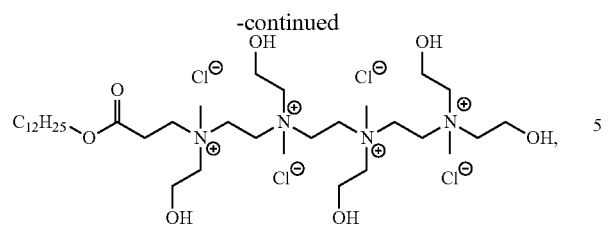
and
combinations thereof.
* * * * *